No. 883,275.  
PATENTED MAR. 31, 1908.  
E. T. BARKER.  
ADJUSTABLE TRAP FOR SOIL PIPES.  
APPLICATION FILED APR. 11, 1907.
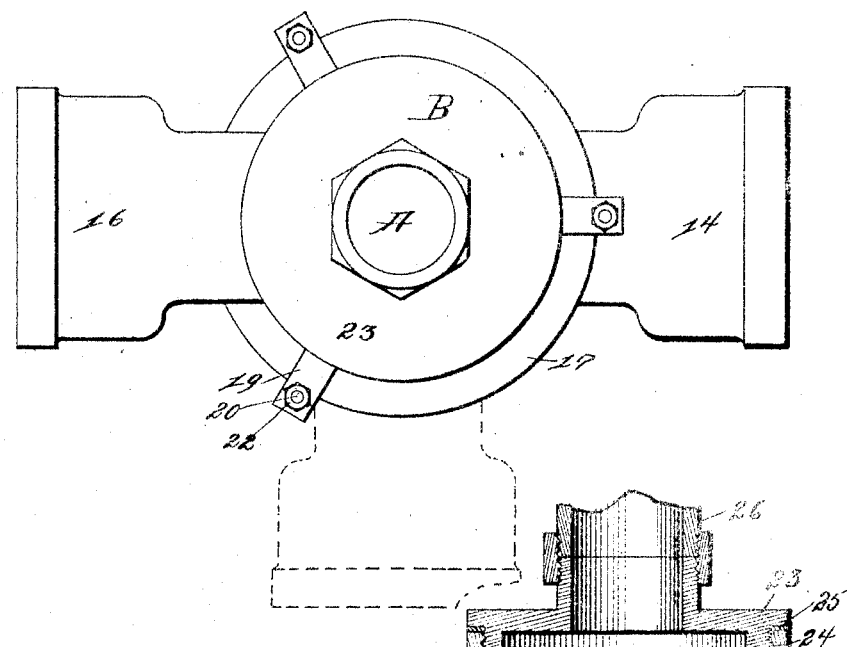
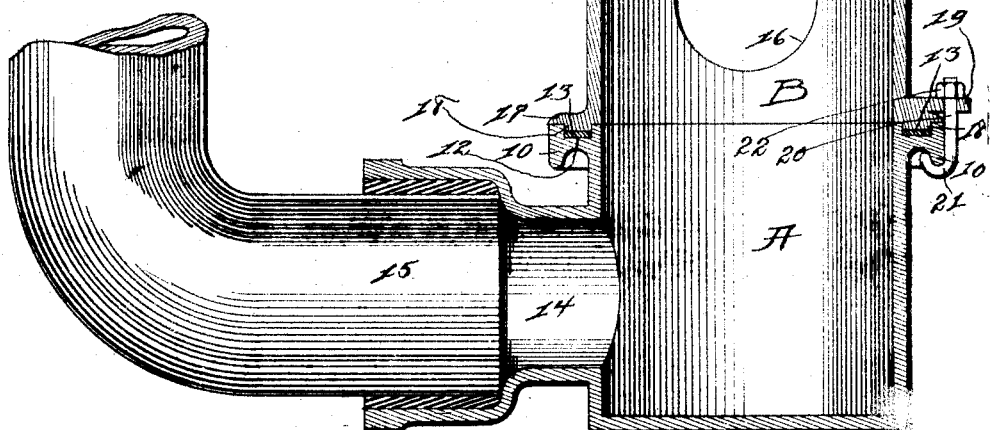
Witnesses:  
Inventor: Edgar T. Barker,  
By Thomas J. Orwig, Attorney.

UNITED STATES PATENT OFFICE.

EDGAR T. BARKER, OF MARSHALLTOWN, IOWA.

ADJUSTABLE TRAP FOR SOIL-PIPES.

No. 883,275.	Specification of Letters Patent.	Patented March 31, 1908.

Application filed April 11, 1907. Serial No. 368,088.

*To all whom it may concern:*

Be it known that I, EDGAR T. BARKER, a citizen of the United States, residing at Marshalltown, in the county of Marshall and State of Iowa, have invented a new and useful Adjustable Trap for Soil-Pipes, of which the following is a specification.

My object is to facilitate the adjustment of two cylindrical parts of a trap as required to connect the trap with pipes that extend laterally at various degrees of angle from the trap and my invention consists in the peculiar manner of adjustably and advantageously connecting the two parts of the trap as hereinafter set forth, pointed out in my claims and illustrated in the accompanying drawings in which—

Figure 1 is a top view of the trap and the dotted lines indicate how the soil pipes connected therewith may be adjusted relative to each other and the location of a bowl in a closet. Fig. 2 is a vertical sectional view of the trap and shows how the two parts are fitted together and adjustably connected.

The letter A designates the lower part of the trap. It has a closed bottom, open top and a flange 10 at its exterior that is concaved on its under side and has a continuous groove 12 in its top face to admit a packing ring 13 as shown in Fig. 2. It also has an integral lateral extension 14 at its lower portion for connecting a soil pipe 15 therewith to be extended to a bowl in a closet.

The upper part B is open at its bottom and top and has a lateral extension 16 to be extended to a sewer. It has a flange 17 at its bottom and an annular enlargement 18 on the lower side of the flange fitted in the groove in the top of the flange so the two parts can be rotated relative to each other as required to change the angle of the pipes 14 and 16 relative to each other as indicated by dotted lines in Fig. 1.

Integral enlargements 19 extend radially from the flange 17 and have bolt holes and through these holes are extended upwards screw bolts 20 that have hooks 21 that enter the groove 12 in the flange 10 of the part A so that by nuts 22 on the tops of the bolts the two parts A and B can be clamped together rigidly and a water tight joint produced by means of packing ring 13 in the groove 12.

The top of the part B has an internal screw and a top 23 having an integral external screw 24 is fitted in the top of the part B and a packing ring 25 is clamped between the two overlying parts. The top 23 also has an integral central upward extension for connecting a ventilating pipe 26 therewith to be extended to the outside of a building in which the trap is located.

To adjust the two parts A and B relative to each other as required to project the extensions 14 and 16 at various degrees of angles relative to the trap it is only necessary to relax the nuts 22 on the bolts 20 and then turn one of the parts A and B. The hooks 21 on the lower ends of the bolts will slide in the continuous groove in the under side of the flange 10 and consequently the bolts need not be withdrawn in making adjustments and time and labor is saved by my peculiar manner of adjustably connecting the parts A and B.

Having thus set forth the purposes of my invention and its construction, application and manner of use the practical operation and utility thereof is obvious.

What I claim as new and desire to secure by Letters-Patent, is:—

1. In an adjustable trap for soil pipes and the like, a lower cylindrical part having a lateral extension, a closed bottom and an open top, a continuous flange extending outward at its top, a continuous groove in the underside of the flange and a continuous groove in the top face of the flange, an upper cylindrical part provided with a lateral extension and open at its bottom and top, an internal screw at its top, a continuous flange extending outward at its bottom, and a continuous enlargement projecting downward from the bottom of the flange, bolt holes in the flange, bolts extended up in said bolt holes, nuts on the bolts, and hooks at the lower ends of the bolts extended into the groove in the underside of the flange at the top of the lower part, arranged and combined to operate as set forth.

2. An adjustable trap for soil pipes and the like comprising a lower cylindrical part, closed at its bottom and open at its top and provided with a flange at its top having continuous grooves in its under and top faces and also provided with a lateral extension, an upper mating part having a lateral extension, an open top having an internal screw, a pipe connected with the open top, a continuous flange extending outward from its bottom fitted to the grooved flange of the mating lower part and provided with bolt holes, bolts in the bolt holes, nuts on the bolts and hooks at the lower ends of the bolts extended into the groove in the under face of the flange at the top of the lower part, to operate as set forth.

EDGAR T. BARKER.

Witnesses:
A. C. BUCHANAN,
M. J. BOUGHTON.